United States Patent
Ota et al.

(10) Patent No.: US 11,802,510 B2
(45) Date of Patent: Oct. 31, 2023

(54) HEAT INSULATING MATERIAL ASSEMBLY AND GAS TURBINE

(71) Applicant: MITSUBISHI HEAVY INDUSTRIES, LTD., Tokyo (JP)

(72) Inventors: Tadashi Ota, Yokohama (JP); Susumu Sekine, Yokohama (JP); Hyota Abe, Yokohama (JP); Takayuki Ikarashi, Yokohama (JP); Shingo Yamasue, Yokohama (JP); Kazuki Kitagawa, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/789,658

(22) PCT Filed: Apr. 14, 2021

(86) PCT No.: PCT/JP2021/015422
§ 371 (c)(1),
(2) Date: Jun. 28, 2022

(87) PCT Pub. No.: WO2021/215323
PCT Pub. Date: Oct. 28, 2021

(65) Prior Publication Data
US 2023/0031413 A1    Feb. 2, 2023

(30) Foreign Application Priority Data
Apr. 24, 2020    (JP) .................................. 2020-077167

(51) Int. Cl.
*F02C 7/06* (2006.01)
*F02C 7/12* (2006.01)

(52) U.S. Cl.
CPC . *F02C 7/06* (2013.01); *F02C 7/12* (2013.01)

(58) Field of Classification Search
CPC .......... F02C 7/06; F02C 7/12; F05D 2240/15; F05D 2260/20; F05D 2220/32; F01D 25/162; F01D 25/145; F01D 25/24
USPC ......................................................... 415/111
See application file for complete search history.

(56) References Cited

U.S. PATENT DOCUMENTS

| | | | |
|---|---|---|---|
| 10,094,285 B2 | 10/2018 | Munshi et al. | |
| 11,085,324 B2 | 8/2021 | Iijima et al. | |
| 2004/0109785 A1 | 6/2004 | Doody | |
| 2006/0260292 A1* | 11/2006 | Tanioka | ........... F01D 5/288 |
| | | | 60/39.511 |

(Continued)

FOREIGN PATENT DOCUMENTS

| | | |
|---|---|---|
| EP | 2 813 685 | 12/2014 |
| JP | 6142000 | 6/2017 |
| JP | 6601948 | 11/2019 |

*Primary Examiner* — Yi-Kai Wang
(74) *Attorney, Agent, or Firm* — Wenderoth, Lind & Ponack, L.L.P.

(57) ABSTRACT

A heat insulating material assembly is provided with: a heat insulating material covering an outer surface of a casing of a gas turbine; and a guard part disposed so as to protrude from the outer surface of the casing and face an end surface of the heat insulating material. The heat insulating material is disposed outside an arrangement area of a plurality of openings for air intake from an external space into the casing and on an opposite side to the arrangement area across the guard part.

12 Claims, 10 Drawing Sheets

(56) References Cited

U.S. PATENT DOCUMENTS

2008/0310949 A1* 12/2008 Kondo .................... F01D 25/08
  415/47
2016/0201490 A1* 7/2016 Scott ....................... F01D 9/065
  415/213.1

* cited by examiner

HEAT INSULATING MATERIAL ASSEMBLY AND GAS TURBINE

TECHNICAL FIELD

The present disclosure relates to a heat insulating material assembly and a gas turbine.

The present application claims priority on Japanese Patent Application No. 2020-077167 filed Apr. 24 2020, the entire content of which is incorporated herein by reference.

BACKGROUND ART

Cooling air may be introduced from the outside to the inside of a casing of a gas turbine to cool the gas turbine.

Patent Document 1 discloses a gas turbine in which a slot (through hole) is Provided in an outer casing of an exhaust part for taking in cooling air from the outside to the inside of the outer casing. In this gas turbine, a cooling air passage is formed between the outer surface of the outer casing of the exhaust part and a panel disposed radially outward of the outer casing, and cooling air from the cooling air passage is taken into the outer casing through the slot. This cooling air cools parts (struts, etc.) arranged in the outer casing. In the gas turbine of Patent Document 1, an insulating layer (heat insulating material) is disposed so as to cover the outer surface of the panel forming the cooling air passage together with the outer casing.

CITATION LIST

Patent Literature

Patent Document 1: JP6142000B

SUMMARY

Problems to be Solved

A heat insulating material (heat retaining material) may be provided on the outer surface of a casing of a gas turbine. After installing the heat insulating material, with the passage of time, the heat insulating material may be displaced from the original position due to deterioration or its own weight. If an air intake hole provided in the casing is blocked by the heat insulating material moved in this way, the gas turbine may not be properly cooled, for example, the cooling may be insufficient.

In view of the above, an object of at least one embodiment of the present invention is to provide a heat insulating material assembly and a gas turbine that enable proper cooling of the gas turbine.

Solution to the Problems

A heat insulating material assembly according to at least one embodiment of the present invention is provided with: a heat insulating material covering an outer surface of a casing of a gas turbine; and a guard part disposed so as to protrude from the outer surface of the casing and face an end surface of the heat insulating material. The heat insulating material is disposed outside an arrangement area of a plurality of openings for air intake from an external space into the casing and on the opposite side to the arrangement area across the guard part.

Further, a gas turbine according to at least one embodiment of the present invention is provided with: a casing; a heat insulating material covering an outer surface of the casing; and a guard part disposed so as to protrude from the outer surface of the casing and face an end surface of the heat insulating material. The heat insulating material is disposed outside an arrangement area of a plurality of openings for air intake from an external space into the casing and on the opposite side to the arrangement area across the guard part.

Advantageous Effects

At least one embodiment of the present invention provides a heat insulating material assembly and a gas turbine that enable proper cooling of the gas turbine.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

Configuration of Gas Turbine

Figure 1:
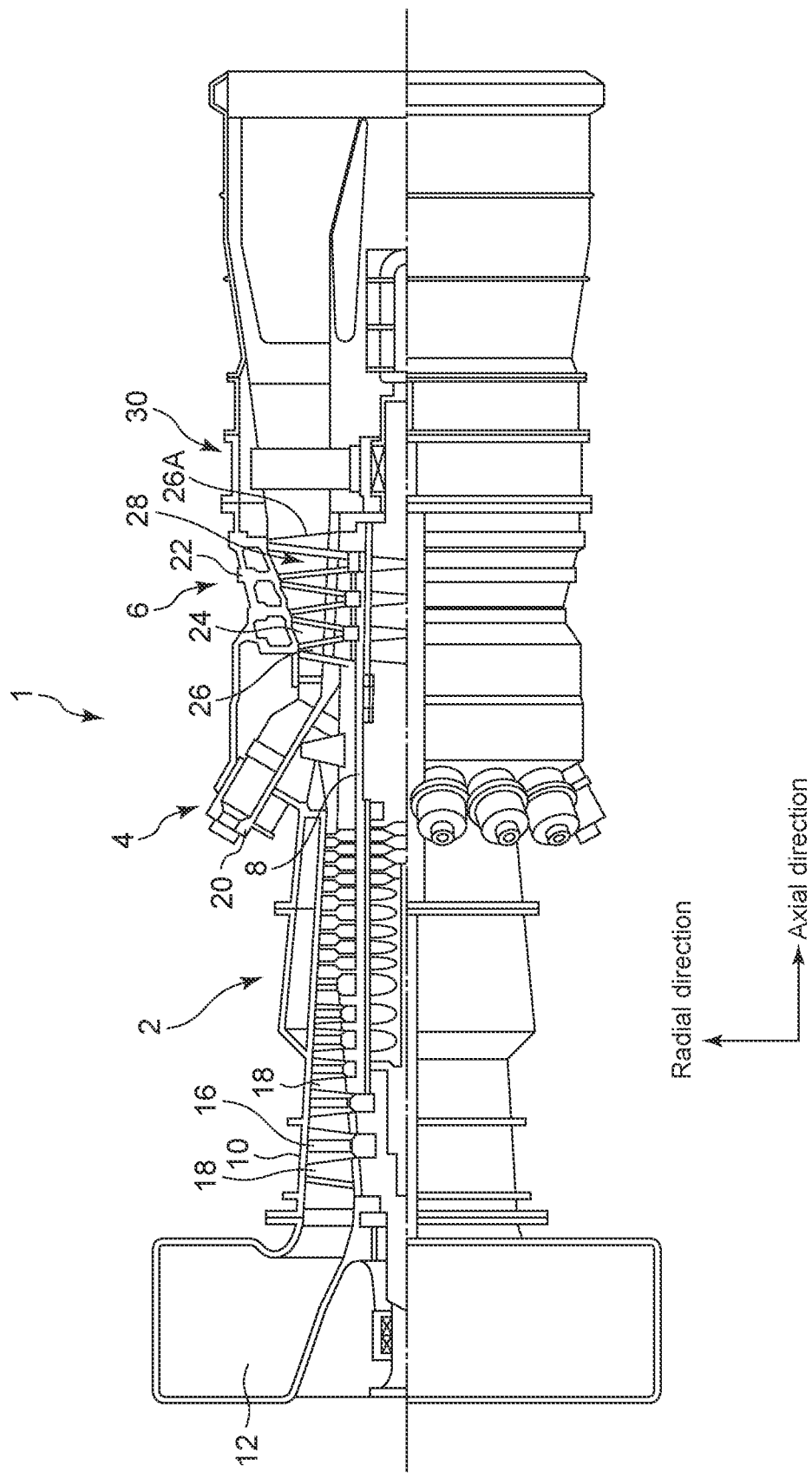
FIG. 1 is a schematic diagram of a gas turbine according to an embodiment.

FIG. 1 is a schematic diagram of a gas turbine according to an embodiment. As shown in FIG. 1, the gas turbine 1 includes a compressor 2 for producing compressed air, a combustor 4 for producing combustion gas from the compressed air and fuel, and a turbine 6 configured to be rotationally driven by the combustion gas. In the case of the gas turbine 1 for power generation, a generator (not shown) is connected to the turbine 6.

The compressor 2 includes a plurality of stator vanes 16 fixed to a compressor casing 10 and a plurality of rotor blades 18 implanted on a rotor 8 so as to be arranged alternately with the stator vanes 16. Intake air from an air inlet 12 is sent to the compressor 2. The air passes through the plurality of stator vanes 16 and the plurality of rotor blades 18 and is compressed into compressed air having a high temperature and a high pressure.

The combustor 4 is supported by a combustor casing 20. The compressed air from the compressor 2 is supplied to the combustor 4 via an interior space of the combustor casing 20, and fuel from a fuel port is also supplied to the combustor 4. In the combustor 4, the fuel and the compressed air are mixed and combusted to generate the combustion gas serving as a working fluid of the turbine 6. As shown in FIG. 1, a plurality of combustors 4 may be disposed along the circumferential direction in the combustor casing 20, centering around the rotor 8.

The turbine 6 has a combustion gas passage 28 formed in a turbine casing 22 and includes a plurality of stator vanes 24 and a plurality of rotor blades 26 disposed in the combustion gas passage 28. The stator vanes 24 are fixed to the turbine casing 22, and a set of the stator vanes 24 arranged along the circumferential direction of the rotor 8 forms a stator vane row. Further, the rotor blades 26 are mounted on the rotor 8, and a set of the rotor blades 26 arranged along the circumferential direction of the rotor 8 forms a rotor blade row. The stator vane rows and the rotor blade rows are alternately arranged in the axial direction of the rotor 8. The plurality of rotor blades 26 includes a last-stage rotor blade 26A disposed on the most downstream side in the combustion gas flow among the plurality of rotor blades 26.

In the turbine 6, as the combustion gas introduced from the combustor 4 into the combustion gas passage 28 passes through the plurality of stator vanes 24 and the plurality of rotor blades 26, the rotor 8 is rotationally driven. Thereby, the generator connected to the rotor 8 is driven to generate power. The combustion gas (exhaust gas) having driven the turbine 6 is discharged outside via the exhaust casing 30.

Figure 2:
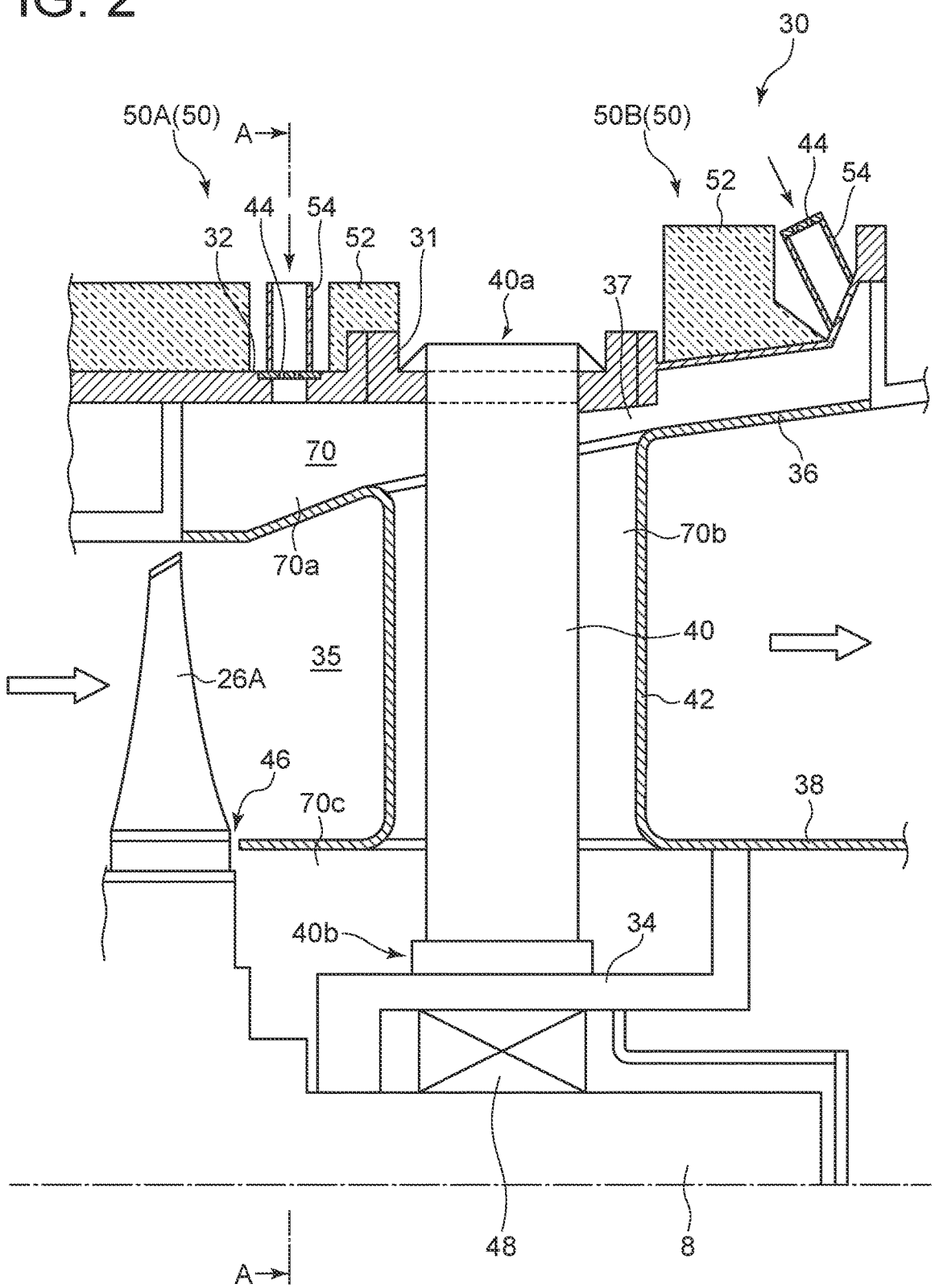
FIG. 2 is a schematic diagram of an exhaust casing according to an embodiment.
Figure 3:
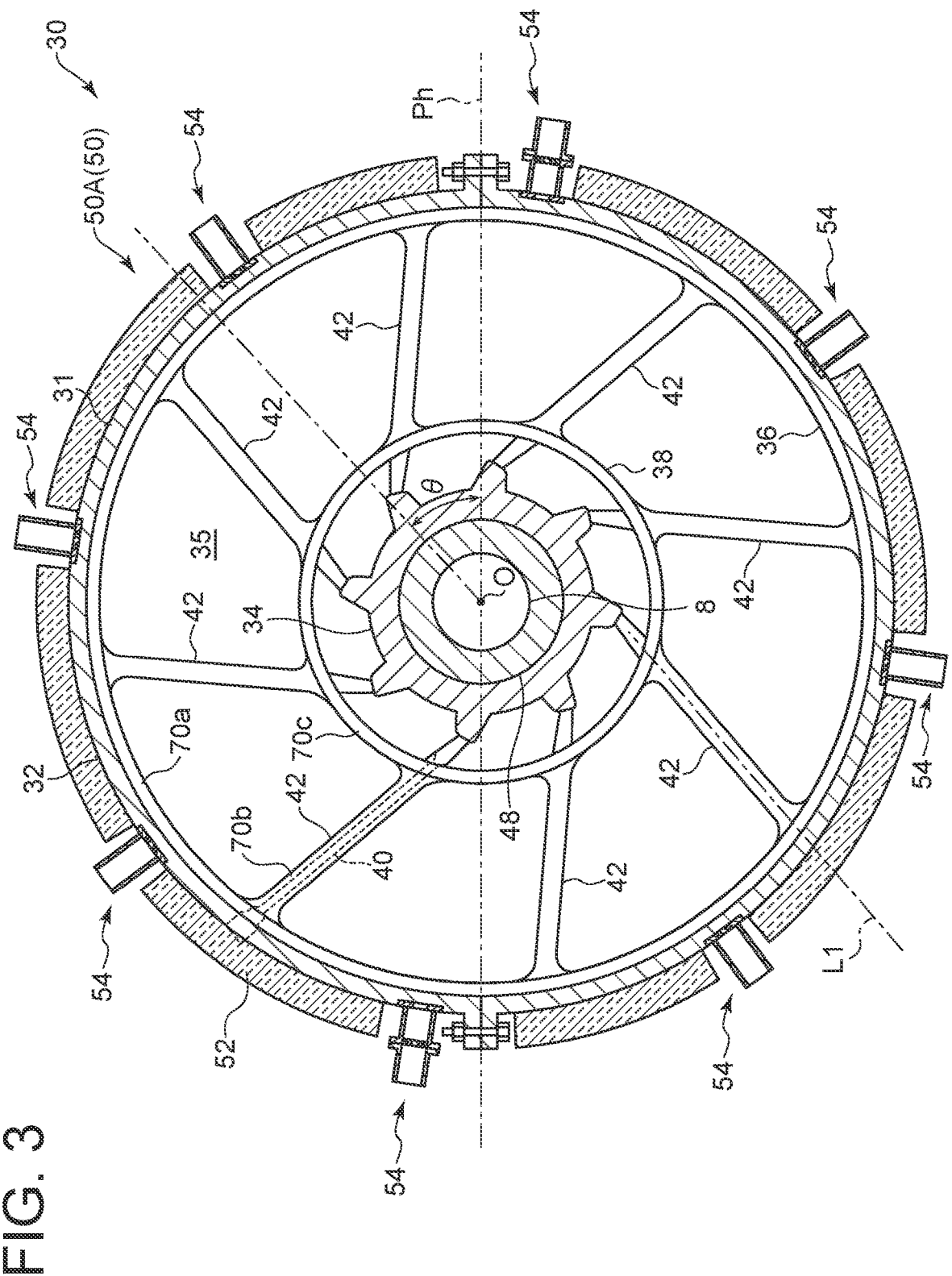
FIG. 3 is a cross-sectional view taken along line A-A in FIG. 2.

FIG. 2 is a schematic diagram of the exhaust casing 30 according to an embodiment. FIG. 3 is a cross-sectional view taken along line A-A in FIG. 2. As shown in FIGS. 2 and 3, the exhaust casing 30 includes a tubular casing wall 31 (casing) extending along the axial direction of the rotor 8 (the direction of central axis O) as a whole, an outer diffuser 36 and an inner diffuser 38 forming an exhaust passage 35, a strut 40 (bearing support member) for supporting a bearing 48, and a strut cover 42 covering the outer surface of the strut 40. The bearing 48 is housed in a bearing box 34 disposed in the casing wall 31, and is configured to rotatably support the rotor 8 of the gas turbine 1.

The outer diffuser 36 and the inner diffuser 38 are disposed so as to form an annular exhaust passage 35 radially inward of the casing wall 31 and radially outward of the bearing box 34.

An outer end portion 40a, which is one end portion of the strut 40 in the longitudinal direction, is fixed to the casing wall 31, and an inner end portion 40b, which is the other end portion in the longitudinal direction, is fixed to the bearing box 34, The bearing box 34 is supported by the casing 31 via the strut 40. The strut 40 is disposed so as to penetrate the outer diffuser 36 and the inner diffuser 38 and traverse the exhaust passage 35.

In some embodiments, multiple struts 40 are arranged at intervals in the circumferential direction. In the illustrated embodiment, the exhaust casing 30 is provided with eight struts, but the number of struts is not limited thereto. As shown in FIG. 3, the struts 40 may be disposed so as to extend along the tangential direction of the bearing box 34.

The strut cover 42 is disposed so as to surround the strut 40 and extend between the outer diffuser 36 and the inner diffuser 38. The strut cover 42 may be connected at the radially outer end to the outer diffuser 36 and at the radially inner end to the inner diffuser 38.

A space 70b is formed between the outer surface of the strut 40 and the inner surface of the strut cover 42. The space 70b communicates with a space 70a formed between the casing wall 31 and the outer diffuser 36. Further, the space 70b communicates with a space 70c formed between the bearing box 34 and the inner diffuser 38. The spaces 70a, 70b, and 70c constitute a cooling passage 70 through which cooling air flows.

To the cooling passage 70, air in an external space of the gas turbine 1 is introduced through a plurality of openings 44 for air intake provided in the casing wall 31. That is, the plurality of openings 44 communicates with the cooling passage 70. Further, the air from the cooling passage 70 is discharged to the exhaust passage 35 upstream of the strut 40 through a discharge port 46 disposed in the inner diffuser 38.

Due to the differential pressure between the external space of the gas turbine 1 and the exhaust passage 35, air in the external space is drawn into the cooling passage 70 through the openings 44. The air introduced to the cooling passage 70 passes through the spaces 70a, 70b, and 70c, and then is discharged from the cooling passage 70 through the discharge port 46. The air flowing through the cooling passage 70 cools components (e.g., outer diffuser 36, inner diffuser 38, strut 40, or strut cover 42) arranged in the exhaust casing 30.

As shown in FIGS. 2 and 3, the gas turbine 1 further includes a heat insulating material 52 covering an outer surface 32 of the casing wall 31 (casing), and a guard part 54 to prevent the plurality of openings 44 for taking in air into the cooling passage 70 from being blocked by the heat insulating material 52. The heat insulating material 52 and the guard part 54 constitute a heat insulating material assembly 50.

The gas turbine 1 including the heat insulating material 52 and the guard part 54 (heat insulating material assembly 50) according to some embodiments will now be described in more detail.

Figure 4A:
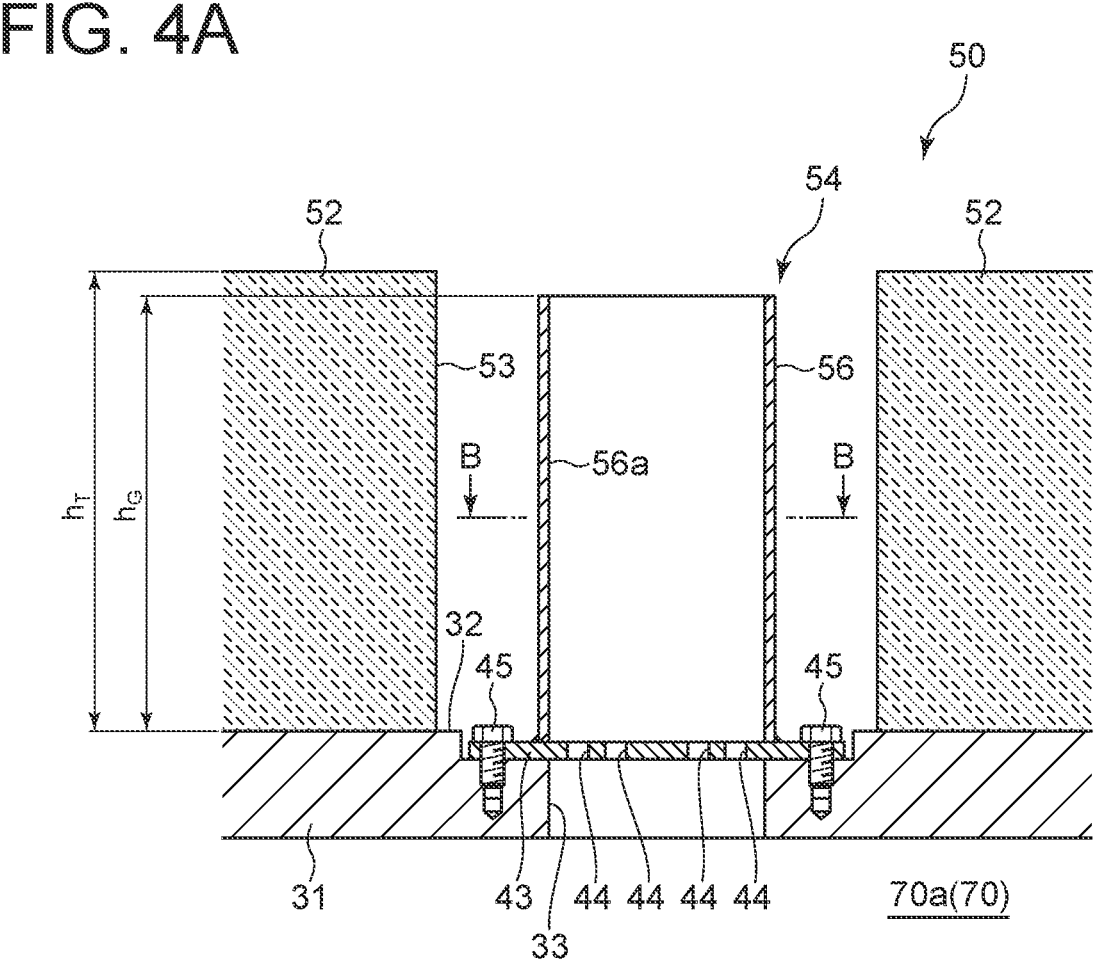
FIG. 4A is a schematic partial cross-sectional view of a gas turbine including a heat insulating material assembly according to an embodiment.
Figure 4B:
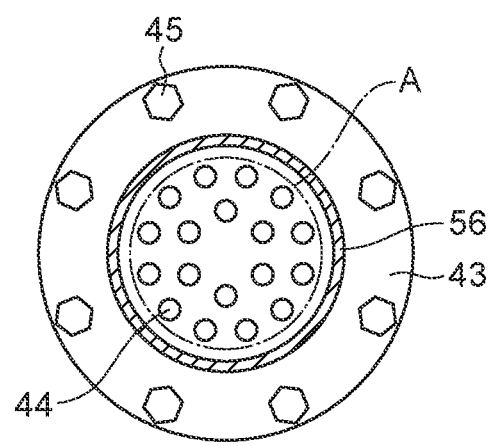
FIG. 4B is a cross-sectional view taken along line B-B of FIG. 4A.

FIGS. 4A and 5 to 7 are each a schematic partial cross-sectional view of the gas turbine 1 including the heat insulating material assembly 50 according to an embodiment. FIG. 4B is a cross-sectional view taken along line B-B of FIG. 4A. FIGS. 8 to 11 are each a schematic perspective view of the heat insulating material assembly 50 according to an embodiment. FIG. 12 is a schematic cross-sectional view of the gas turbine 1 including the heat insulating material assembly 50 according to an embodiment. FIG. 8 is a schematic perspective view of the heat insulating material assembly 50 shown in FIGS. 4A and 4B.

As shown in FIGS. 2 to 3 and 4A to 7, the gas turbine 1 includes the heat insulating material (heat retaining material) 52 coverings the outer surface 32 of the casing wall 31 (casing) of the exhaust casing 30, and the guard part 54 disposed so as to protrude from the outer surface 32 of the casing wall 31 on which the heat insulating material 52 is provided. As shown in FIGS. 4A to 7, the guard part 54 is disposed so as to face an end surface 53 of the heat insulating material 52. The heat insulating material 52 is disposed outside an arrangement area A (see FIG. 4B) of the plurality of openings 44 for air intake from an external space into the casing wall 31 (casing) and on the opposite side of the guard part 54 from the arrangement area A of the plurality of openings 44. In other words, the guard part 54 is disposed between the heat insulating material 52 and the arrangement area A of the plurality of openings 44.

Figure 5:
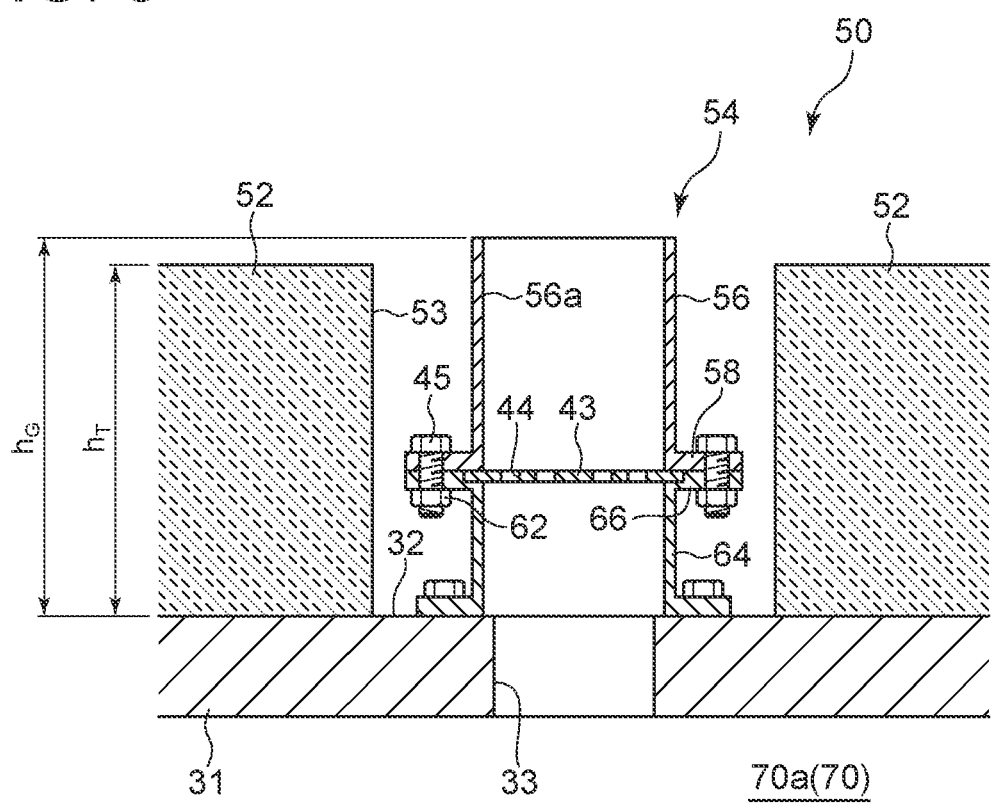
FIG. 5 is a schematic partial cross-sectional view of a gas turbine including a heat insulating material assembly according to an embodiment.
Figure 6:
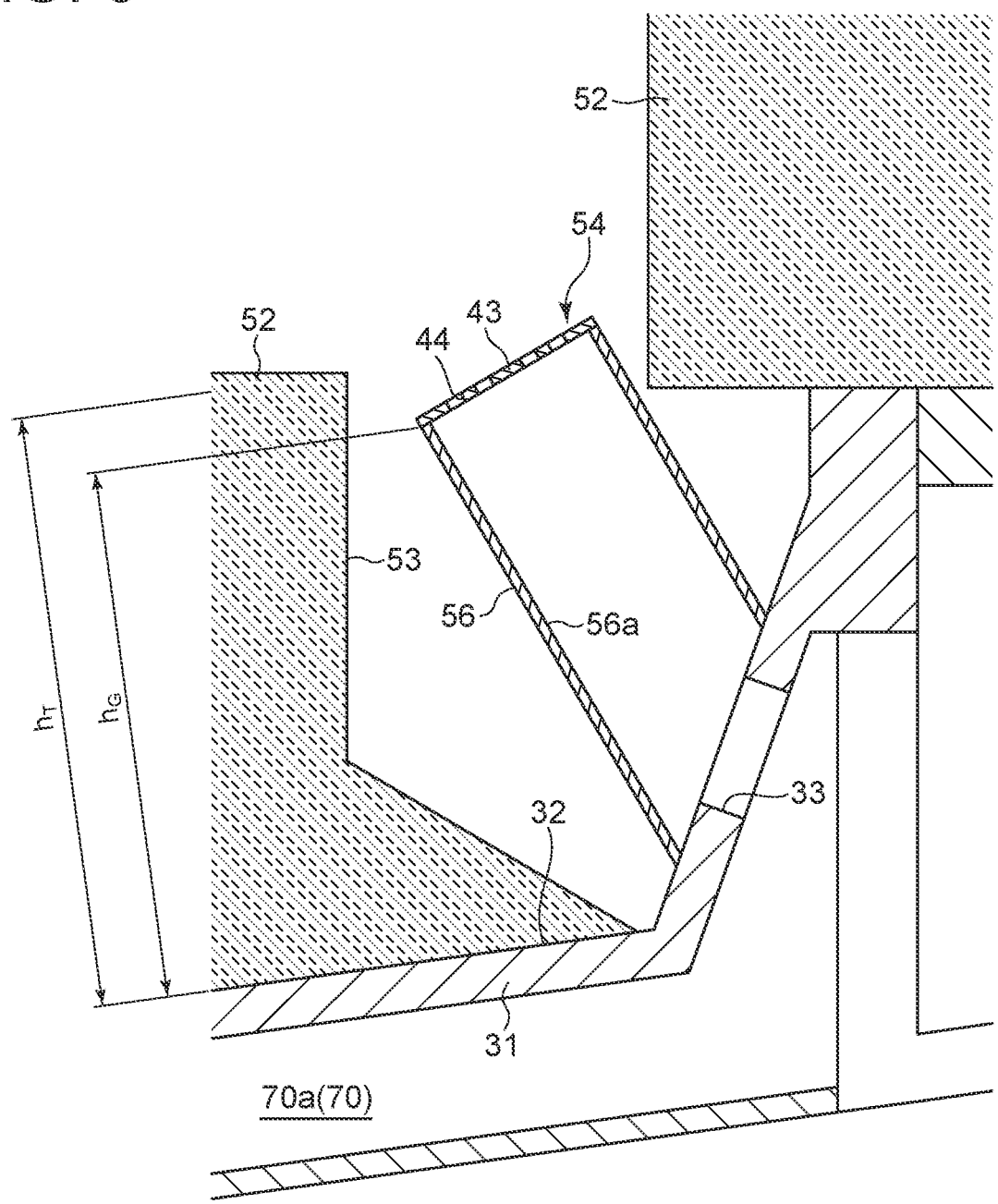
FIG. 6 is a schematic partial cross-sectional view of a gas turbine including a heat insulating material assembly according to an embodiment.
Figure 7:
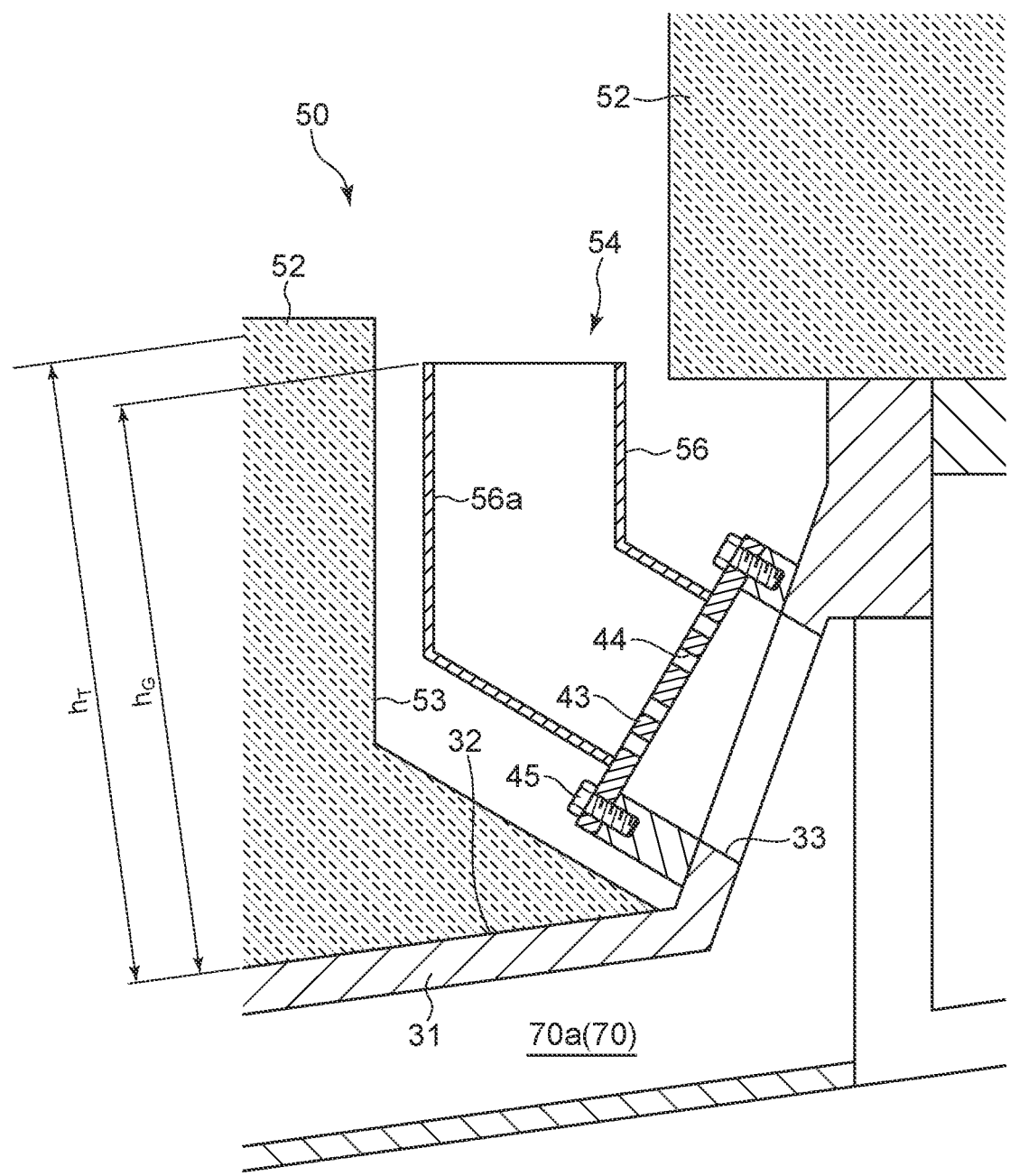
FIG. 7 is a schematic partial cross-sectional view of a gas turbine including a heat insulating material assembly according to an embodiment.
Figure 8:
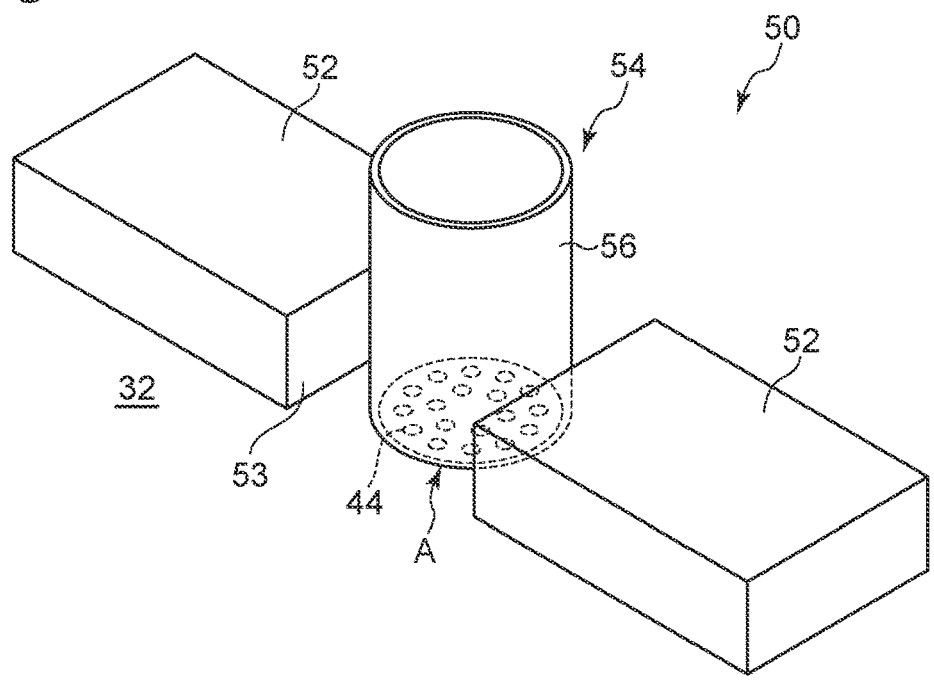
FIG. 8 is a schematic perspective view of a heat insulating material assembly according to an embodiment.

In the exemplary embodiments shown in FIGS. 4A to 7, the guard part 54 includes a tubular member 56 having an inner peripheral surface 56a surrounding the plurality of openings 44. The tubular member 56 may have a straight shape as shown in FIGS. 4A to 6 or may have a bent shape as shown in FIG. 7.

The size and number of openings 44 for air intake are appropriately set according to the amount of cooling air introduced into the cooling passage 70 formed inside the casing wall 31. The plurality of openings 44 may be disposed at multiple positions in the axial direction or the circumferential direction of the gas turbine 1. A plurality of the guard parts 54 may be disposed so as to correspond to the pluralities of openings 44 disposed at multiple positions.

The exhaust casing 30 of the gas turbine 1 shown in FIG. 2 has pluralities of openings 44 disposed at different positions in the axial direction. Specifically, the exhaust casing 30 has a plurality of openings 44 at each position upstream and downstream of the strut 40. Further, the heat insulating material assemblies 50 (upstream heat insulating material assembly 50A and downstream heat insulating material assembly 50B) each including the guard part 54 are disposed so as to correspond to the pluralities of openings 44 on the upstream side and the downstream side of the strut 40, respectively.

The plurality of openings 44 and the guard part 54 (heat insulating material assembly 50) may be disposed on the upstream side or the downstream side of the strut 40 in the axial direction, or may be disposed so as to at least partially overlap the strut 40.

The exhaust casing 30 of the gas turbine 1 shown in FIG. 3 has pluralities of openings 44 disposed at multiple positions in the circumferential direction. Further, a plurality of the guard parts 54 are disposed so as to correspond to the pluralities of openings 44 disposed at multiple positions (eight positions in FIG. 3). That is, the upstream heat insulating material assembly 50A includes a plurality of (eight in FIG. 3) guard parts 54 arranged along the circumferential direction.

Although not shown in FIG. 3, the downstream heat insulating material assembly 50B may also include a plurality of guard parts 54 arranged along the circumferential direction at intervals. In this case, the plurality of guard parts 54 of the upstream heat insulating material assembly 50A and the plurality of guard parts 54 of the downstream heat insulating material assembly 50B may be disposed at the same position in the circumferential direction, or may be disposed at different positions in the circumferential direction.

The heat insulating material 52 and/or the guard part 54 may be disposed on a portion of the casing wall 31 extending along the axial direction, for example, as with the upstream heat insulating material assembly 50A shown in FIG. 2. The heat insulating material assembly 50 shown in FIGS. 4A and 5 is an example of such a heat insulating material assembly. Alternatively, the heat insulating material 52 and/or the guard part 54 may be disposed on a portion of the casing wall 31 extending along a direction oblique to the axial direction, for example, as with the downstream heat insulating material assembly 50B shown in FIG. 2. The heat insulating material assembly 50 shown in FIGS. 6 and 7 is an example of such a heat insulating material assembly.

The plurality of openings 44 may be provided in the casing wall 31, or may be provided in a member attached to the casing wall 31. In the exemplary embodiments shown in FIGS. 4A to 7, the plurality of openings 44 is formed in a plate 43 attached to the casing wall 31. The plurality of openings 44 communicates with the cooling passage 70 in the casing wall 31 through a communication hole 33 provided in the casing wall 31.

In the exemplary embodiments shown in FIGS. 4A and 7, the plurality of openings 44 is formed in a plate 43 attached to the casing wall 31 with bolts 45. The tubular member 56 constituting the guard part 54 is attached to the plate 43 by welding or the like.

In the exemplary embodiment shown in FIG. 5, the plurality of openings 44 is formed in a plate 43 fixed between an intermediate member 64 attached to the casing wall 31 and the tubular member 56 constituting the guard part 54. That is, the plate 43 is attached to the casing wall 31 via the intermediate member 64. With the plate 43 sandwiched between a flange portion 58 disposed at one end of the tubular member 56 and a flange portion 66 of the intermediate member 64, the flange portions 58 and 66 are connected to each other by bolts 45 and nuts 62, so that the plate 43 is fixed, and the guard part 54 is attached to the casing wall 31 via the intermediate member 64. The use of the intermediate member 64 allows the plate 43 to be attached to the casing wall 31 via the intermediate member 64 even if it is difficult to directly attach the plate 43 to the casing wall 31 due to factors such as a small installation space.

In the exemplary embodiment shown in FIG. 6, one end of the tubular member 56 constituting the guard part 54 is attached to the casing wall 31 by welding or the like, and the plate 43 is attached to the other end of the tubular member 56 by welding or the like. That is, the plate 43 is attached to the casing wall 31 via the tubular member 56.

A heat insulating material (heat retaining material) provided on the outer surface of a casing of a gas turbine may be displaced from the original position due to deterioration or its own weight with the passage of time after installation. If an air intake hole provided in the casing is blocked by the heat insulating material moved in this way, the gas turbine may not be properly cooled, for example, the cooling may be insufficient.

In this regard, according to the above-described embodiments, the guard part 54 is disposed between the heat insulating material 52 covering the outer surface of the casing wall 31 (casing) and the arrangement area A of the plurality of openings 44 for air intake into the casing wall 31 so as to protrude from the outer surface 32 of the casing wall 31. The guard part 54 restricts the movement of the heat insulating material 52 toward the arrangement area A of the plurality of openings 44. Thus, it is possible to prevent the plurality of openings 44 from being blocked by the heat insulating material 52, and it is possible to properly cool the gas turbine 1.

Further, in a cross-section perpendicular to the central axis O of the rotor 8 (see FIG. 3), in a region where the angle θ (see FIG. 3) centered on the central axis O of the rotor 8 and based on the horizontal plane Ph (see FIG. 3) passing through the central axis O is not more than 60 degrees, the heat insulating material 52 is likely to be displaced due to factors such as its own weight. If air intake ports in the exhaust casing 30 are blocked due to the displacement of the heat insulating material 52 partially in the circumferential direction, the cooling may become non-uniform in the circumferential direction, and for example, the clearance between the rotating part and the stationary part may not be appropriately maintained due to the difference in the heat expansion of the constituent parts (struts 40 and casing wall 31) of the exhaust casing 30.

In this regard, according to the above-described embodiments, since the plurality of guard parts 54 are arranged so as to correspond to the pluralities of openings 44 disposed at multiple positions along the circumferential direction of the gas turbine 1, it is possible to prevent the plurality of openings 44 at each position from being blocked by the heat insulating material 52. For example, it is possible to effectively prevent the plurality of openings 44 from being blocked by the heat insulating material 52 within the above-described range of angle θ.

As a result, the introduction of cooling air into the casing wall 31 (cooling passage 70) is less likely to be hindered at each position in the circumferential direction where the plurality of openings 44 is disposed, facilitating circumferentially even cooling of the plurality of struts 40 arranged in the circumferential direction and the casing wall 31 supporting the struts 40. As a result, it is possible to suppress non-uniform thermal elongation or creep deformation of the casing wall 31 or an increase in shall vibration of the gas turbine 1. Consequently, it is possible to prevent the damage to the gas turbine 1.

In some embodiments, the guard part 54 is disposed offset from an extension line L1 (see FIG. 3) of the strut 40 in the circumferential direction of the gas turbine 1. In this case, the heat insulating material assembly 50 can be appropriately installed in the gas turbine 1 while avoiding interference between the strut 40 and the guard part 54.

In some embodiments, the height $h_G$ of the guard part 54 (tubular member 56 in FIGS. 4A to 7) from the outer surface 32 of the casing wall 31 on which the heat insulating material 52 is provided is 50% or more of the thickness $h_T$ of the heat insulating material 52. Alternatively, the height $h_G$ of the guard part 54 may be 65% or more of the thickness $h_T$ of the heat insulating material 52.

Here, the "height of the guard part from the outer surface of the casing (casing wall 31)" means the height of the portion of the guard part 54 that faces the end surface 53 of the heat insulating material 52 from the outer surface 32 of the casing wall 31 (casing) covered with the heat insulating material 52 (see FIGS. 4A to 7). This definition also applies to the case where the "outer surface" covered with the heat insulating material 52 is not flush with the "outer surface" on which the guard part 54 (tubular member 56 in FIGS. 6 and 7) is provided (see FIGS. 6 and 7), for example, as shown in FIGS. 6 and 7.

According to the above-described embodiments, since the height of the guard part 54 from the outer surface 32 of the casing wall 31 (casing) on which the heat insulating material 52 is provided is 50% or more or 65% or more of the thickness $h_T$ of the heat insulating material 52, the guard part 54 effectively restricts the movement of the heat insulating material 52. Thus, it is possible to effectively prevent the plurality of openings 44 from being blocked by the heat insulating material 52, and it is possible to properly cool the gas turbine 1.

In some embodiments, the guard part 54 is at least partially detachably disposed on the casing wall 31 (casing). For example, in the exemplary embodiment shown in FIG. 7, the guard part 54 (tubular member 56) can be relatively easily attached to or detached from the casing wall 31 with the bolts 45 and nuts 62.

According to the above-described embodiments, since the guard part 54 is at least partially detachable from the casing wall 31 (casing), by detaching the guard part 54, it becomes easy to access the arrangement area A of the plurality of openings 44. This facilitates the maintenance of the gas turbine 1, such as the adjustment of the openings, by replacing the plate 43 (see FIGS. 4A to 7) provided with the plurality of openings 44, for example.

The guard part 54 is not limited to a particular shape as long as it can prevent the heat insulating material 52 from entering the arrangement area A of the plurality of openings 44. The guard part 54 may include, for example, a tube-like member, a rod-like member, or a plate-like member, or may include a pipe arranged outside the casing wall 31.

As already described, in the exemplary embodiments shown in FIGS. 2 to 8, the guard part 54 includes the tubular member 56 having the inner peripheral surface 56a surrounding the plurality of openings 44.

In this case, the guard part 54 can be obtained with a simple configuration including the tubular member 56. Additionally, since the inner peripheral surface 56a of the tubular member 56 surrounds the plurality of openings 44, the guard part 54 effectively restricts the movement of the heat insulating material 52. Consequently, it is possible to effectively prevent the plurality of openings 44 from being blocked by the heat insulating material 52.

Figure 9:
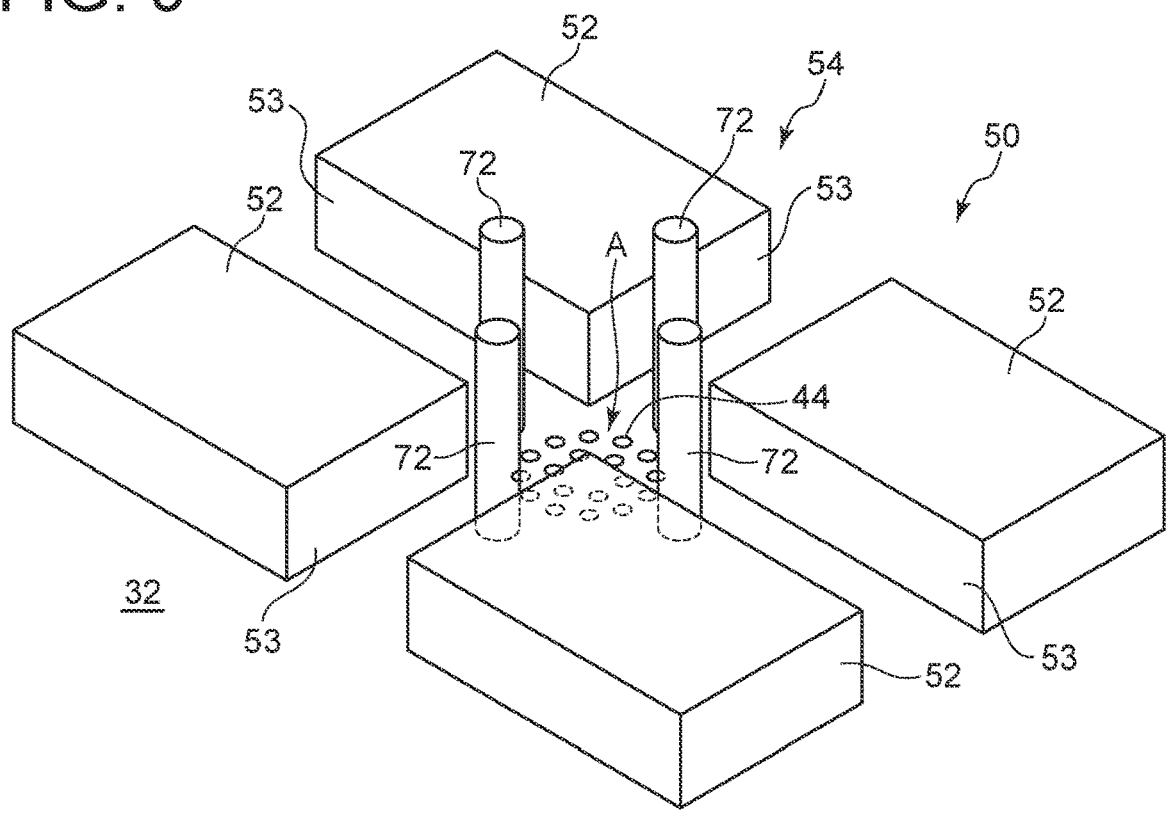
FIG. 9 is a schematic perspective view of a heat insulating material assembly according to an embodiment.
Figure 10:
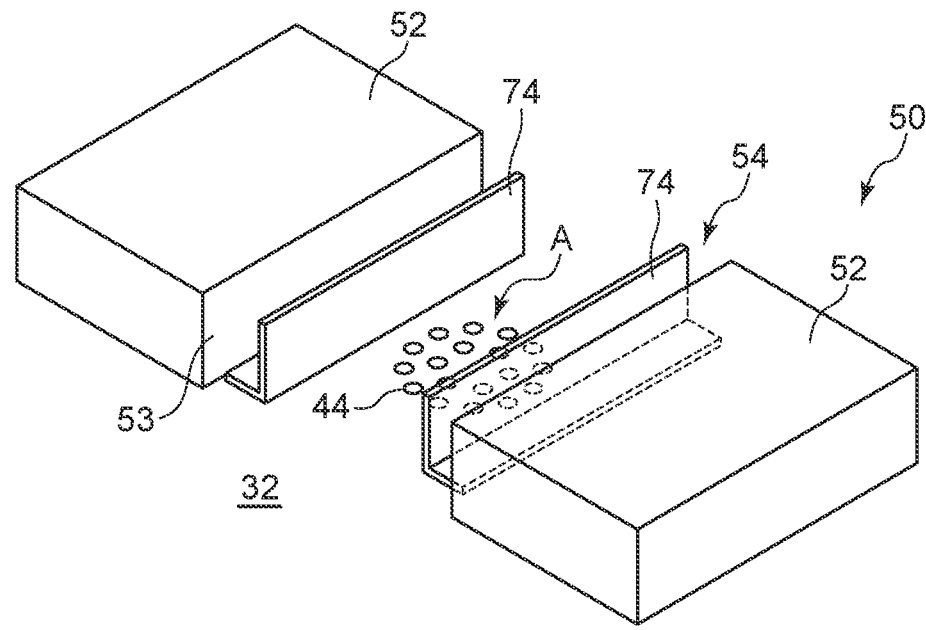
FIG. 10 is a schematic perspective view of a heat insulating material assembly according to an embodiment.

In some embodiments, for example as shown in FIGS. 9 and 10, the guard part 54 includes a rod-like member 72 or a plate-like member 74 disposed so as to protrude from the surface of the casing wall 31 (casing). In the exemplary embodiment shown in FIG. 9, the guard part 54 includes a plurality of rod-like members 72 disposed so as to protrude from the surface of the casing wall 31. In the exemplary embodiment shown in FIG. 10, the guard part 54 includes a plurality of L-shaped steel plates as the plate-like members 74 disposed so as to protrude from the surface of the casing wall 31.

In this case, the guard part 54 can be obtained with a simple configuration including the rod-like member 72 or the plate-like member 74. This effectively restricts the movement of the heat insulating material 52. Consequently, it is possible to effectively prevent the plurality of openings 44 from being blocked by the heat insulating material 52.

Figure 11:
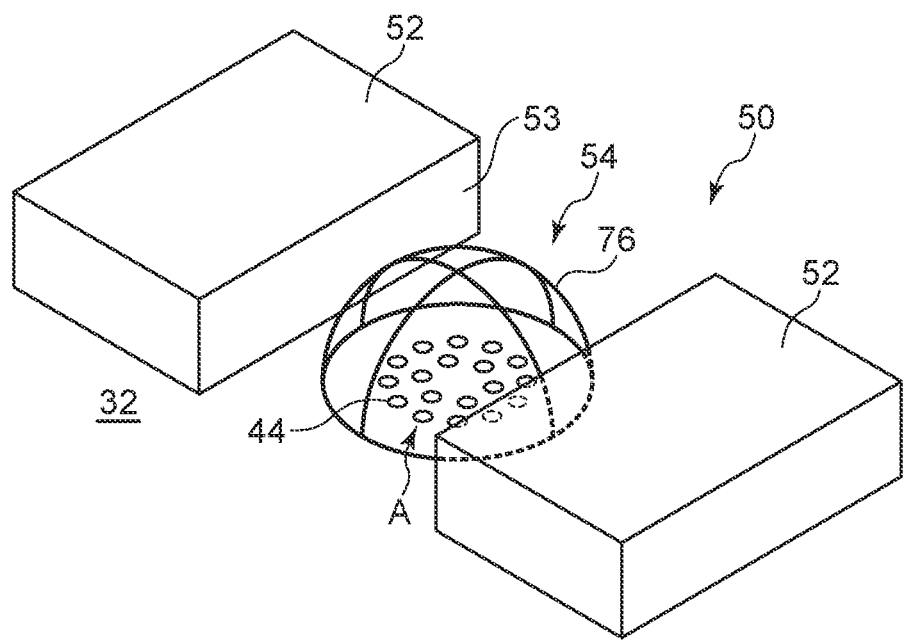
FIG. 11 is a schematic perspective view of a heat insulating material assembly according to an embodiment.
Figure 12:
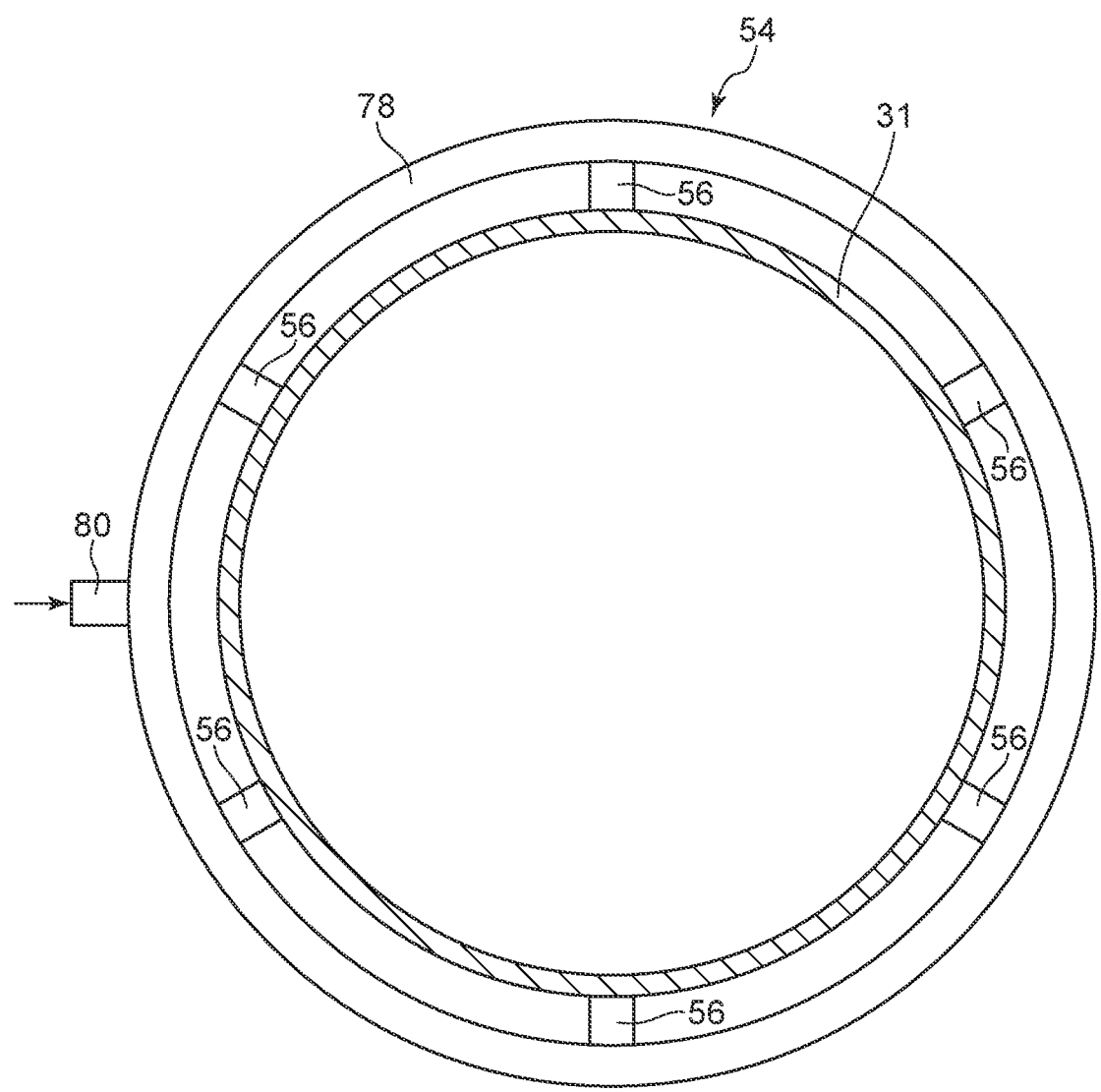
FIG. 12 is a schematic cross-sectional view of a gas turbine including a heat insulating material assembly according to an embodiment.

In some embodiments, for example as shown in FIG. 11, the guard part 54 includes a mesh member 76 covering the plurality of openings 44.

In this case, the guard part 54 can be obtained with a simple configuration including the mesh member 76. This effectively restricts the movement of the heat insulating material 52. Consequently, it is possible to effectively prevent the plurality of openings 44 from being blocked by the heat insulating material 52.

In some embodiments, for example as shown in FIG. 12, the guard part 54 includes a plurality of tubular members 56 arranged along the circumferential direction, and a pipe 78 connecting the plurality of tubular members 56 so as to communicate the plurality of tubular members 56. Air from an external space may be introduced to the pipe 78 via an air guide portion 80, and the air may be distributed from the pipe 78 to each tubular member 56. In FIG. 12, components arranged inside the casing wall 31 are not depicted.

In some embodiments, the heat insulating material 52 may have a block shape, for example, as shown in FIGS. 4A, 5 to 7, and 8 to 11.

In the above-described embodiments, since the heat insulating material 52 has a block shape, the heat insulating material 52 is less likely to deform than, for example, a sheet-like heat insulating material, so that it is less likely to lose its posture or move from the installation position. Thus, it is possible to effectively restrict the movement of the heat insulating material 52. Consequently, it is possible to prevent the plurality of openings 44 from being blocked by the heat insulating material 52, and it is possible to properly cool the gas turbine 1.

The contents described in the above embodiments would be understood as follows, for instance.

(1) A heat insulating material assembly (50) according to at least one embodiment of the present invention is provided with: a heat insulating material (52) covering an outer surface (32) of a casing (e.g., the above-described casing wall 31) of a gas turbine (1); and a guard part (54) disposed so as to protrude from the outer surface of the casing and face an end surface (53) of the heat insulating material. The heat insulating material is disposed outside an arrangement area (A) of a plurality of openings (44) for air intake from an external space into the casing and on the opposite side to the arrangement area across the guard part.

According to the above configuration (1), the guard part is disposed between the heat insulating material covering the outer surface of the casing and the arrangement area of the plurality of openings for air intake into the casing so as to protrude from the outer surface of the casing on which the heat insulating material is provided. The guard part restricts the movement of the heat insulating material toward the arrangement area of the plurality of openings. Thus, it is possible to prevent the plurality of openings from being blocked by the heat insulating material, and it is possible to properly cool the gas turbine.

(2) In some embodiments, in the above configuration (1), the height ($h_G$) of the guard part from the outer surface of the casing is 50% or more of the thickness ($h_T$) of the heat insulating material.

According to the above configuration (2), since the height of the guard part from the outer surface of the casing on which the heat insulating material is provided is 50% or more of the thickness of the heat insulating material, it is possible to effectively restrict the movement of the heat insulating material. Consequently, it is possible to effectively prevent the plurality of openings from being blocked by the heat insulating material.

(3) In some embodiments, in the above configuration (1) or (2), the guard part is at least partially detachably disposed on the casing.

According to the above configuration (3), since the guard part is at least partially detachable from the casing, by detaching the guard part, it becomes easy to access the arrangement area of the plurality of openings. This facilitates the maintenance of the gas turbine, such as the adjustment or replacement of the openings.

(4) In some embodiments, in any one of the above configurations (1) to (3), the guard part includes a tubular member (56) having an inner peripheral surface (56a) surrounding the plurality of openings.

According to the above configuration (4), the heat insulating material assembly including the guard part can be obtained with a simple configuration including the tubular member. Additionally, since the inner peripheral surface of the tubular member surrounds the plurality of openings, the guard part effectively restricts the movement of the heat insulating material. Consequently, it is possible to effectively prevent the plurality of openings from being blocked by the heat insulating material.

(5) in some embodiments, in any one of the above configurations (1) to (4), the guard part includes a rod-like member (58) or a plate-like member (60) disposed so as to protrude from the surface of the casing.

According to the above configuration (5), the heat insulating material assembly including the guard part can be obtained with a simple configuration including the rod-like member or the plate-like member. This effectively restricts the movement of the heat insulating material. Consequently, it is possible to effectively prevent the plurality of openings from being blocked by the heat insulating material.

(6) In some embodiments, in any one of the above configurations (1) to (5), the guard part includes a mesh member (62) covering the plurality of openings.

According to the above configuration (6), the heat insulating material assembly including the guard part can be obtained with a simple configuration including the mesh member. This effectively restricts the movement of the heat insulating material. Consequently, it is possible to effectively prevent the plurality of openings from being blocked by the heat insulating material.

(7) In some embodiments, in any one of the above configurations (1) to (6), the heat insulating material has a block shape.

According to the above configuration (7), since the heat insulating material has a block shape, the heat insulating material is less likely to deform than, for example, a sheet-like heat insulating material, so that it is less likely to lose its posture or move from the installation position. Thus, it is possible to effectively restrict the movement of the heat insulating material. Consequently, it is possible to prevent the plurality of openings from being blocked by the heat insulating material, and it is possible to properly cool the gas turbine.

(8) In some embodiments, in any one of the above configurations (1) to (7), the plurality of openings communicates with a cooling passage (70) for cooling a bearing support member (e.g., the above-described strut 40) of the gas turbine.

According to the above configuration (8), with the heat insulating material assembly having the above configuration (1), it is possible to restrict the movement of the heat insulating material toward the arrangement area of the plurality of openings. Thus, it is possible to prevent the plurality of openings from being blocked by the heat insulating material. As a result, since the supply of cooling air to the cooling passage is less likely to be hindered, it is possible to properly cool the bearing support member.

Generally, the gas turbine has multiple bearing support members at intervals in the circumferential direction of the gas turbine. In this regard, when the heat insulating material assembly is disposed so as to correspond to each of the pluralities of openings communicating with the cooling passages of the multiple bearing support members, since the supply of cooling air to each cooling passage is less likely to be hindered, it is possible to evenly cool the bearing support members and the casing which supports the bearing support members in the circumferential direction. As a result, it is possible to suppress non-uniform thermal elongation or creep deformation of the casing or an increase in shaft vibration of the gas turbine. Consequently, it is possible to prevent the damage to the gas turbine.

(9) In some embodiments, in the above configuration (8), the guard part is disposed offset from an extension line (L1) of the bearing support member in the circumferential direction of the gas turbine.

According to the above configuration (9), since the guard part is disposed offset from the extension line of the bearing support member in the circumferential direction, the heat insulating material assembly can be installed in the gas turbine while avoiding interference between the bearing support member and the guard part.

(10) A gas turbine (1) according to at least one embodiment of the present invention is provided with: a casing (e.g., the above-described casing wall 31); a heat insulating material (52) covering an outer surface (32) of the casing; and a guard part (54) disposed so as to protrude from the outer surface of the casing and face an end surface (53) of the heat insulating material. The heat insulating material is disposed outside an arrangement area (A) of a plurality of openings (44) for air intake from an external space into the casing and on the opposite side to the arrangement area across the guard part.

According to the above configuration (10), the guard part is disposed between the heat insulating material covering the outer surface of the casing and the arrangement area of the plurality of openings for air intake into the casing so as to protrude from the outer surface of the casing on which the heat insulating material is provided. The guard part restricts the movement of the heat insulating material toward the arrangement area of the plurality of openings. Thus, it is possible to prevent the plurality of openings from being blocked by the heat insulating material, and it is possible to properly cool the gas turbine.

(11) In some embodiments, in the above configuration (10), the gas turbine comprises: the plurality of openings disposed at multiple positions along a circumferential direction, and a plurality of the guard parts arranged along the circumferential direction so as to correspond to the plurality of openings disposed at each of the multiple positions.

According to the above configuration (11), since the plurality of guard parts are arranged so as to correspond to the pluralities of openings disposed at multiple positions along the circumferential direction of the gas turbine, it is possible to prevent the plurality of openings at each position from being blocked by the heat insulating material. This makes it easy to evenly cool the gas turbine in the circumferential direction. As a result, it is possible to suppress non-uniform thermal elongation or creep deformation of the casing or the like or an increase in shaft vibration of the gas turbine. Consequently, it is possible to prevent the damage to the gas turbine.

Embodiments of the present invention were described in detail above, but the present invention is not limited thereto, and various amendments and modifications may be implemented.

Further, in the present specification, an expression of relative or absolute arrangement such as "in a direction", "along a direction", "parallel". "orthogonal", "centered", "concentric" and "coaxial" shall not be construed as indicating only the arrangement in a strict literal sense, but also includes a state Where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", and "have" are not intended to be exclusive of other components.

REFERENCE SIGNS LIST

1 Gas turbine
2 Compressor
4 Combustor
6 Turbine
8 Rotor
10 Compressor casing
12 Air inlet
16 Stator vane
18 Rotor blade
20 Combustor casing
22 Turbine casing
24 Stator vane
26 Rotor blade
26A Last-stage rotor blade
28 Combustion gas passage
30 Exhaust casing
31 Casing gall
32 Outer surface
33 Communication hole
34 Bearing box
35 Exhaust passage
36 Outer diffuser
38 Inner diffuser
40 Strut
40a Outer end portion
40b Inner end portion
42 Strut cover
43 Plate
44 Opening
45 Bolt
46 Discharge port
48 Bearing
50 Heat insulating material assembly
50A Upstream heat insulating material assembly
50B Downstream heat insulating material assembly
52 Heat insulating material
53 End surface
54 Guard part
56 Tubular member
56a Inner peripheral surface
58 Flange portion
62 Nut
64 Intermediate member
66 Flange portion
70 Cooling passage
70a Space
70b Space
70c Space
72 Rod-like member
74 Plate-like member
76 Mesh member
78 Pipe
80 Air guide portion
O Central axis

The invention claimed is:

1. A heat insulating material assembly, comprising:
   a heat insulating material covering an outer surface of a casing of a gas turbine; and
   a guard part disposed so as to protrude from the outer surface of the casing and face an end surface of the heat insulating material,
   wherein when seen from a radial direction of the gas turbine, the guard part is disposed so as to surround a plurality of openings for air intake from an external space into the casing, and
   wherein the heat insulating material is disposed outside an arrangement area of the plurality of openings and on an opposite side to the arrangement area across the guard part.

2. A heat insulating material assembly, comprising:
   a heat insulating material covering an outer surface of a casing of a gas turbine; and
   a guard part disposed so as to protrude from the outer surface of the casing and face an end surface of the heat insulating material,
   wherein the heat insulating material is disposed outside an arrangement area of a plurality of openings for air intake from an external space into the casing and on an opposite side to the arrangement area across the guard part, and
   wherein a thickness of the heat insulating material is larger than a height of the guard part from the outer surface of the casing, and the height of the guard part is 50% or more of the thickness of the heat insulating material.

3. The heat insulating material assembly according to claim 1,
   wherein the guard part is at least partially detachably disposed on the casing.

4. The heat insulating material assembly according to claim 1,
   wherein the guard part includes a tubular member having an inner peripheral surface surrounding the plurality of openings.

5. The heat insulating material assembly according to claim 1,
   wherein the guard part includes a rod-like member or a plate-like member disposed so as to protrude from a surface of the casing.

6. The heat insulating material assembly according to claim 1,
   wherein the guard part includes a mesh member covering the plurality of openings.

7. The heat insulating material assembly according to claim 1,
   wherein the heat insulating material has a block shape.

8. The heat insulating material assembly according to claim 1,
   wherein the plurality of openings communicates with a cooling passage for cooling a bearing support member of the gas turbine.

9. The heat insulating material assembly according to claim 8,
   wherein the guard part is disposed offset from an extension line of the bearing support member in a circumferential direction of the gas turbine.

10. A gas turbine, comprising:
    a casing; and
    the heat insulating material assembly according to claim 1, including:
    the heat insulating material covering an outer surface of the casing; and
    the guard part disposed so as to protrude from the outer surface of the casing and face an end surface of the heat insulating material.

11. The gas turbine according to claim 10, comprising:
    the plurality of openings disposed at multiple positions along a circumferential direction; and
    a plurality of the guard parts arranged along the circumferential direction so as to correspond to the plurality of openings disposed at each of the multiple positions.

12. A gas turbine, comprising:
    a casing; and
    the heat insulating material assembly according to claim 2, including:
    the heat insulating material covering an outer surface of the casing; and
    the guard part disposed so as to protrude from the outer surface of the casing and face an end surface of the heat insulating material.

* * * * *